United States Patent [19]

Hu

[11] Patent Number: 5,494,625
[45] Date of Patent: Feb. 27, 1996

[54] EMBOSSED, INFLATABLE BALL MAKING METHOD

[76] Inventor: Liang F. Hu, No. 10-11, Min Tsu Rd., Shen Kang Hsiang, Tai Chung Hsien, Taiwan

[21] Appl. No.: 294,707

[22] Filed: Aug. 23, 1994

[51] Int. Cl.$^6$ ............................ B29C 59/02; B29D 22/00
[52] U.S. Cl. .................... 264/51; 264/293; 264/321; 264/510; 264/574; 156/147; 273/65 ED
[58] Field of Search .................... 264/321, 293, 264/51, 53, 510, 573, 574; 156/147; 273/65 ED

[56] References Cited

U.S. PATENT DOCUMENTS

| | | | |
|---|---|---|---|
| 2,213,479 | 9/1940 | Voit et al. | 264/574 |
| 2,819,753 | 1/1958 | Nogue | 264/574 |
| 4,312,827 | 1/1982 | Bokelmann | 264/321 |
| 4,462,590 | 7/1984 | Mitchell | 273/65 E |
| 4,598,909 | 7/1986 | Ventura et al. | 273/60 B |
| 4,653,752 | 3/1987 | Miller | 264/248 |
| 4,660,831 | 4/1987 | Kralik | 273/65 E |
| 5,405,469 | 4/1995 | Lin | 156/147 |
| 5,427,372 | 6/1995 | Ratner et al. | 264/293 |

*Primary Examiner*—Allan R. Kuhns
*Attorney, Agent, or Firm*—Lowe, Price, LeBlanc & Becker

[57] ABSTRACT

The method includes the steps of i) molding an inner tube from butyl rubber, ii) processing the outer wall of the inner tube into a coarse surface; iii) preparing cover panels from ethylene vinyl acetate (EVA) through a foaming process and then processing the inside wall of each cover panel into a coarse surface; iv) covering the cover panels over the inner tube by a press to form a blank ball; and v) embossing the surface of the blank ball thus obtained by an embossing machine through a heating process and then quickly cooling the embossed ball.

3 Claims, 6 Drawing Sheets

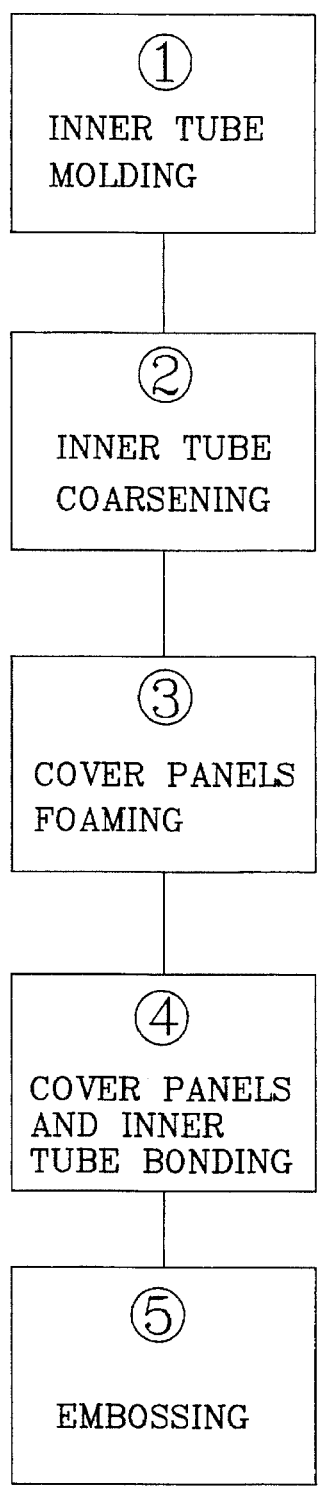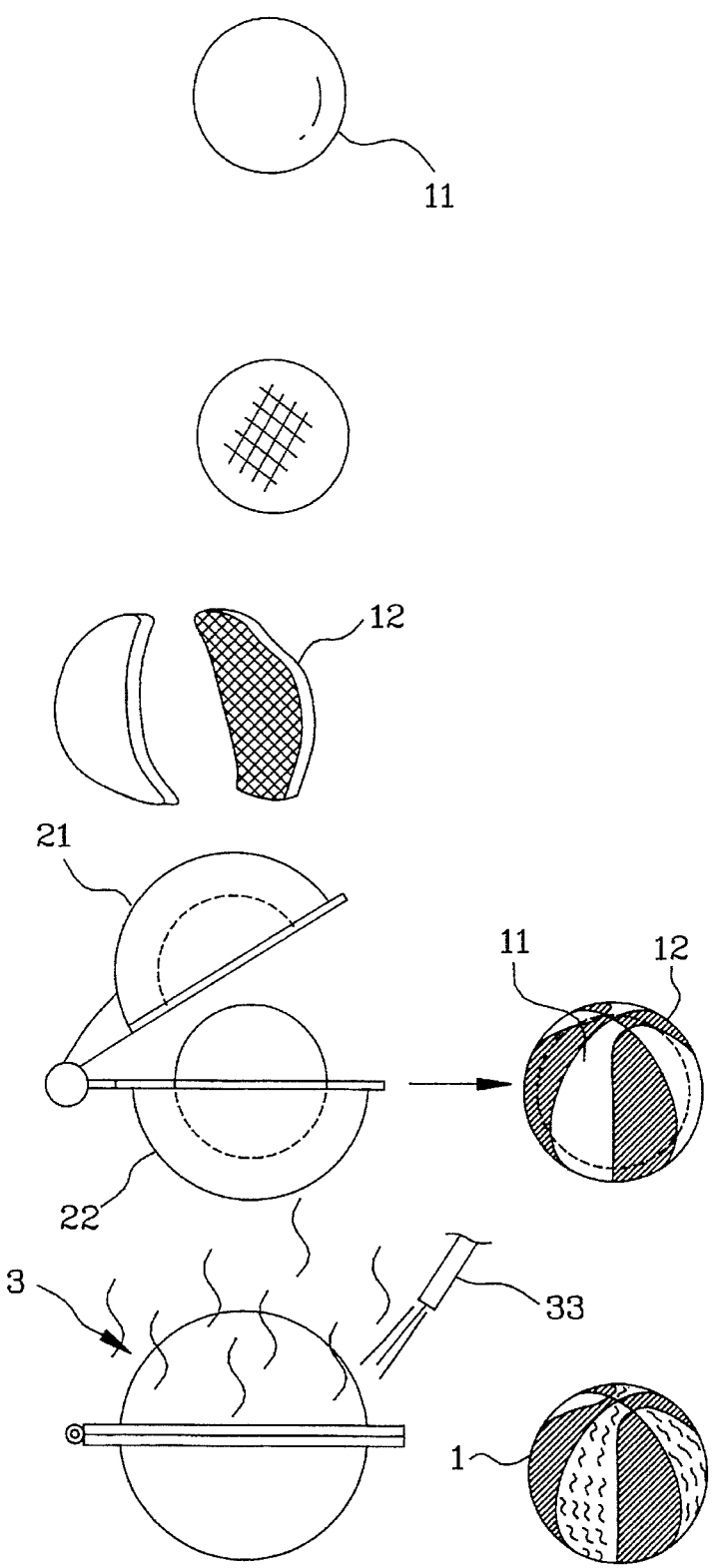
Fig 1

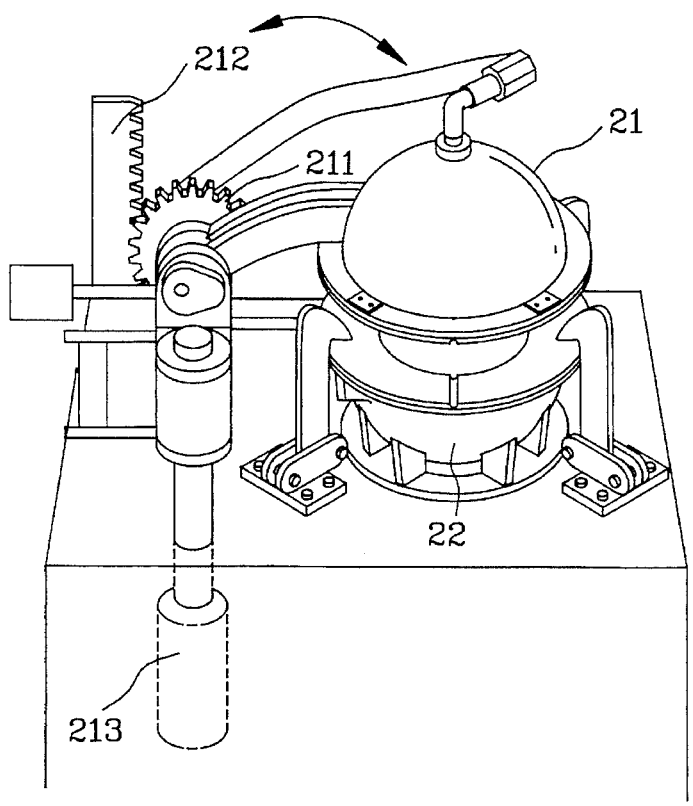
Fig 3-A
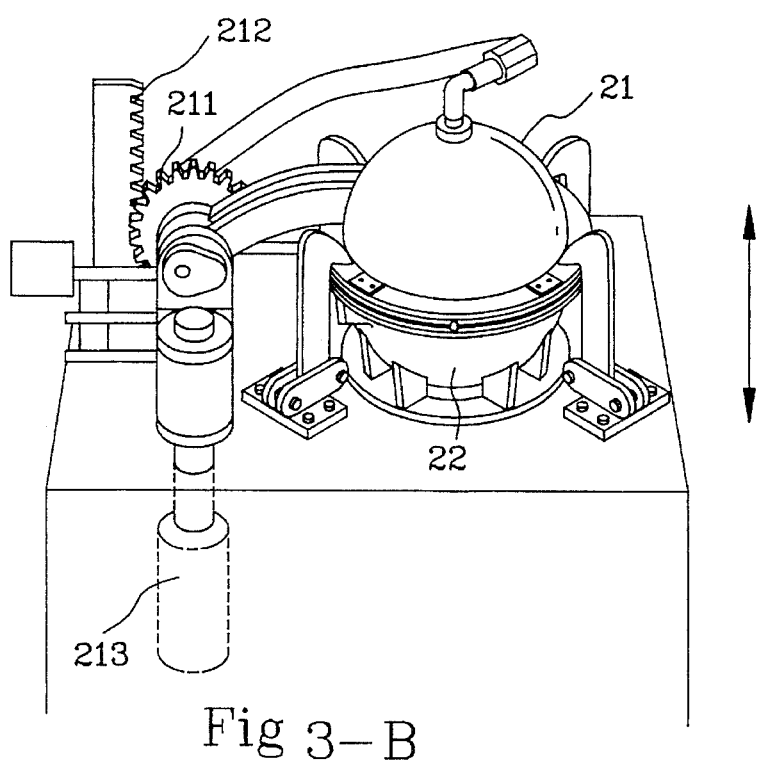
Fig 3-B 5,494,625

EMBOSSED, INFLATABLE BALL MAKING METHOD

BACKGROUND OF THE INVENTION

The present invention relates to a method of making an inflatable toy ball by molding a butyl rubber inner tube and foamed cover panels then covering the cover panels on the inner tube and then embossing the ball.

FIG. 6 illustrates a production flow chart for making inflatable balls according to the prior art, which comprises the steps of: i) molding an inner tube from rubber, ii) processing the outer wall of the inner tube into a coarse surface; iii) preparing a rubber cover leather by a press and then cutting it into cover panels according to a predetermined size; iv) winding the inner tube with threads; v) covering the thread-wounded inner tube with a layer of rubber through a molding process to form a semi-finished ball; vi) covering the cover panels over the semi-finished ball thus obtained to form a blank ball; vii) covering a transfer paper over the blank ball for transfer printing; viii) putting the blank ball with the transfer paper in the mold of a transfer press and the heating the mold to about 150° C. for about 6 minutes; ix) removing the transfer paper and mounting an air valve to the ball. This production procedure is complicated. The embossment on the outer wall of the ball is formed through a rubber heating process. The ball becomes defective and cannot be reproduced if there is any errors during the embossing process. Because of the complicated manufacturing process, the ball is expensive. Furthermore, an inflatable ball made according to this method is heavy and and rigid, and therefore it is commonly used for official games and not suitable for young children to play with. Regular inflatable toy balls for children are commonly made of single layer with the outer surface embossed or printed. However, a single layer inflatable toy ball gives a sense of being cheap and not substantial.

SUMMARY OF THE INVENTION

The present invention has been accomplished under the circumstances in view. It is therefore an object of the present invention to provide a method of making an inflatable ball having an inner tube which is easy to perform. It is another object of the present invention to provide a method of making an inflatable ball having an inner tube which greatly improves the production speed. It is still another object of the present invention to provide a method of making an inflatable ball having an inner tube which allows the ball to be re-embossed if an embossing error happens. It is still another object of the present invention to provide a method of making an inflatable ball having an inner tube which allows the ball bet flexibly made according to market requirements. It is still another object of the present invention to provide a method of making an inflatable ball having an inner tube which requires less installation cost on the machinery.

According to the present invention, an inner tube is first molded from butyl rubber and then the outer wall of the inner tube is processed into a coarse surface, then cover panels are molded from ethylene vinyl acetate and the inside surface of each cover panel is processed into a coarse surface, and then the cover panels and the inner tube are bonded together, and then the outer wall of the blank ball thus obtained is embossed with a pattern. After the embossement, the ball is cooling down, and therefore a finished inflatable ball having an inner tube is thus obtained.

BRIEF DESCRIPTION OF THE DRAWINGS

FIG. 1 illustrates the flow chart of the inflatable ball making method of the present invention;

FIG. 3A shows the upper die of the press of FIG. 2 turned to a horizontal position by the vertical rack of the press;

FIG. 3B shows the upper die of the press of FIG. 2 covered on the bottom die thereof;

DETAILED DESCRIPTION OF THE PREFERRED EMBODIMENT

Figure 2:
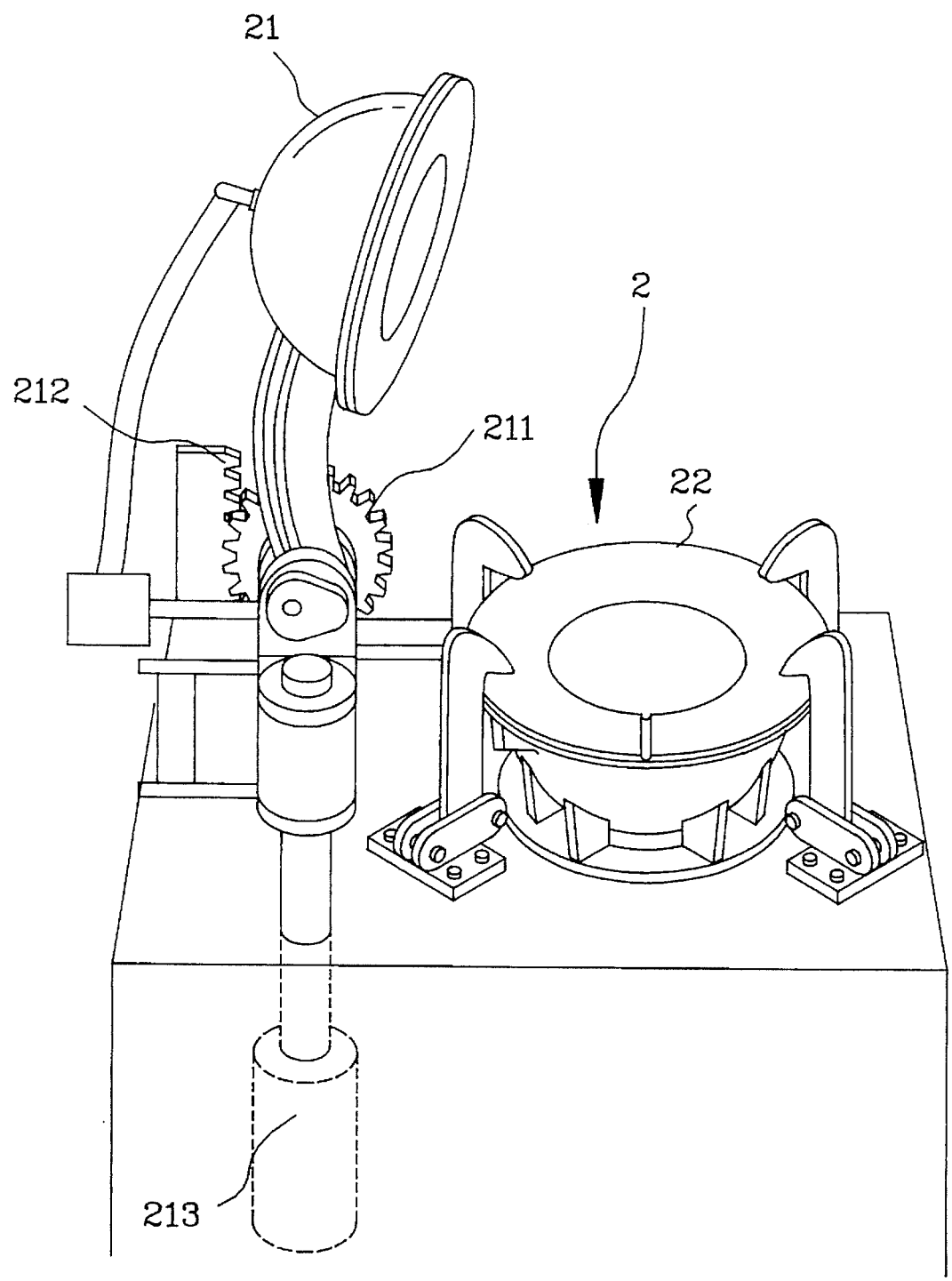
FIG. 2 shows a press for covering cover panels to an inner tube according to the present invention.

Referring to FIG. 1, the method of making an inflatable ball, referenced by 1, in accordance with the present invention comprises the steps of:

i) molding an inner tube 11 from butyl rubber;

ii) processing the outer wall of the inner tube 11 into a coarse surface;

iii) preparing cover panels 12 from ethylene vinyl acetate (EVA) through a foaming process and then processing the inside wall of each cover panel 12 into a coarse surface;

iv) bonding the cover panels 12 to the inner tube 11 by: applying a bonding agent to the inner walls of the cover panels 12 and the outer wall of the inner tube 11, then drying the cover panels 12 and the inner tube 11 in an oven, and then covering the cover panels 12 to the inner tube 11 through press 2 (see FIG. 2) and simultaneously giving an inflation pressure of 8 to 10 lbs to the inner tube 11;

v) embossing the surface of the blank ball thus obtained by: putting the blank ball in an embossing mold and heating the mold to 150° to 180° C. for one minute while the inflation pressure to the inner tube is maintained within 6 to 9 lbs, and then cooling the mold rapidly, and therefore a finished inflatable ball 1 is obtained.

Referring to FIGS. 2, 3A, and 3B, the cover panels 12 are molded from EVA through a foaming process such that the contrast of the raised portions and recessed portions of the embossement on the surface of the finished inflatable ball is apparent. Because the thickness of the cover panels 12 is relatively thicker than the rubber covers of conventional inflatable balls, a special machine must be used to bond the cover panels 12 and the inner tube 11 together. The press 2 shown in FIGS. 2, 3A and 3B is designed for this purpose. The press 2 comprises a bottom die 22 fixed mounted on the machine base, a vertical rack 212 vertically movably mounted on the machine base, an upper die 21 pivotally connected to a mount, which is lifted by a lifter 213 on the machine base and having a gear wheel 211 fixedly mounted on the pivot and meshed with the vertical rack 212, and a fixture (not shown) for fixing the upper and bottom dies 21 and 22 in the closed position. By means of the vertical rack 212, the upper die 21 can be turned to the set position on the mount and then the mount is moved vertically to let the upper die 21 be covered on the bottom die 22.

Figure 4:
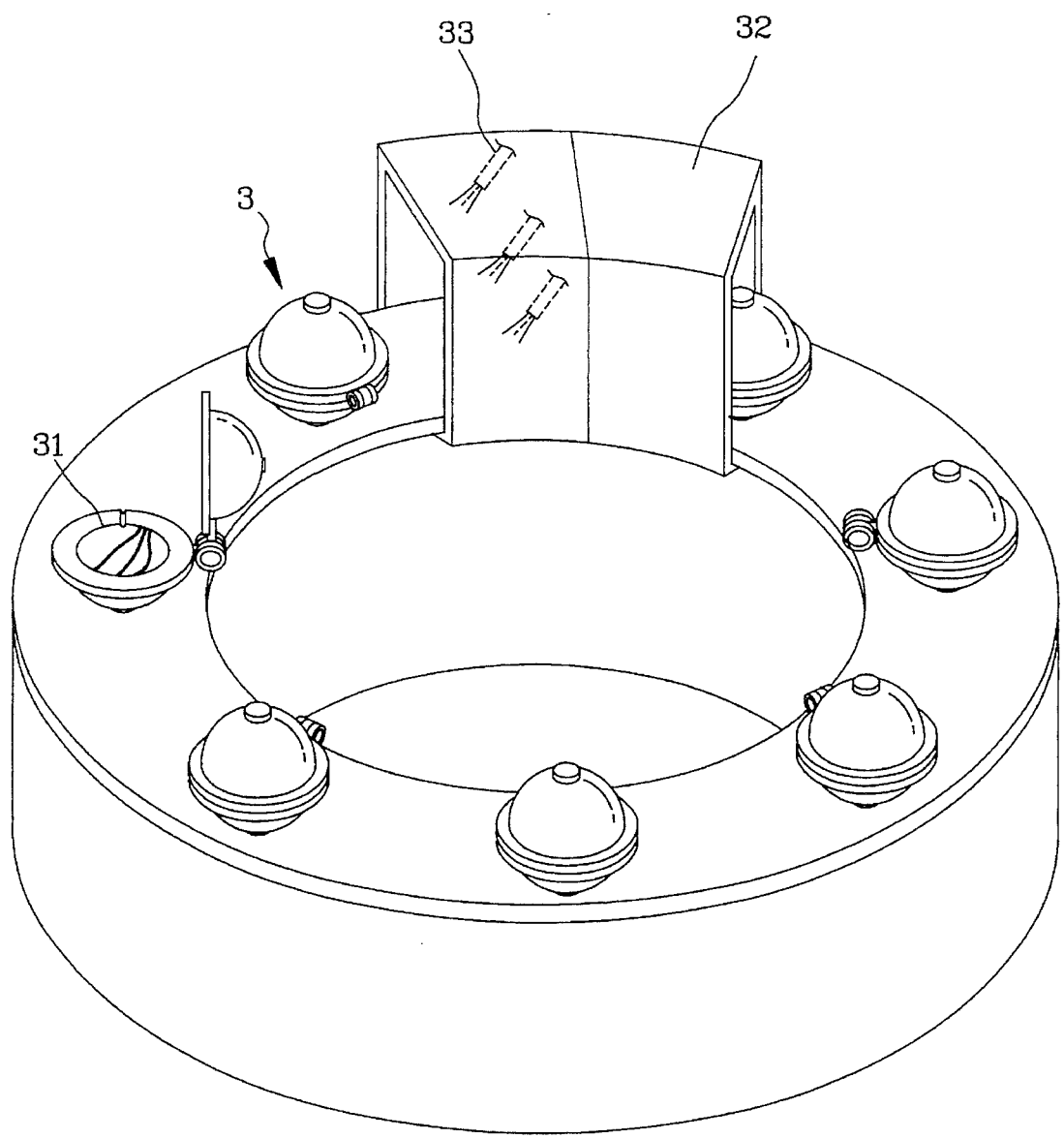
FIG. 4 shows an embossing machine according to the present invention.
Figure 5:
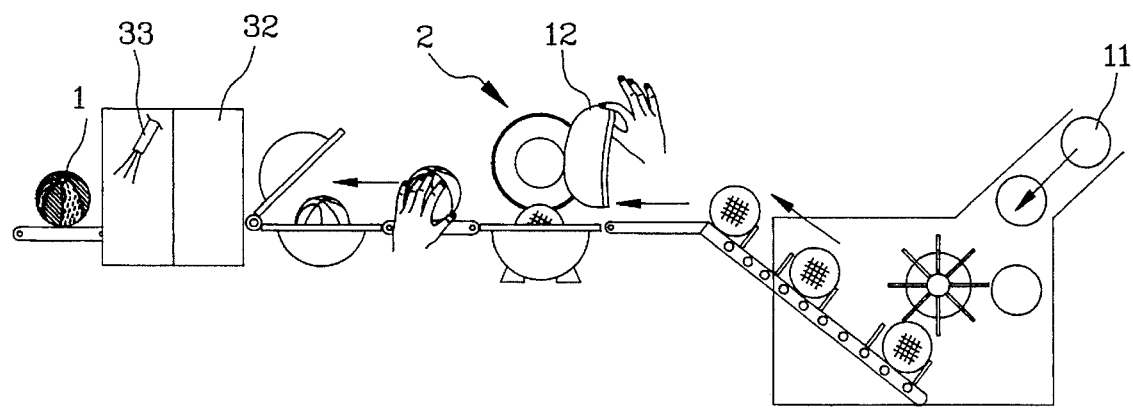
FIG. 5 shows a inflatable ball production line according to the present invention.
Figure 6:
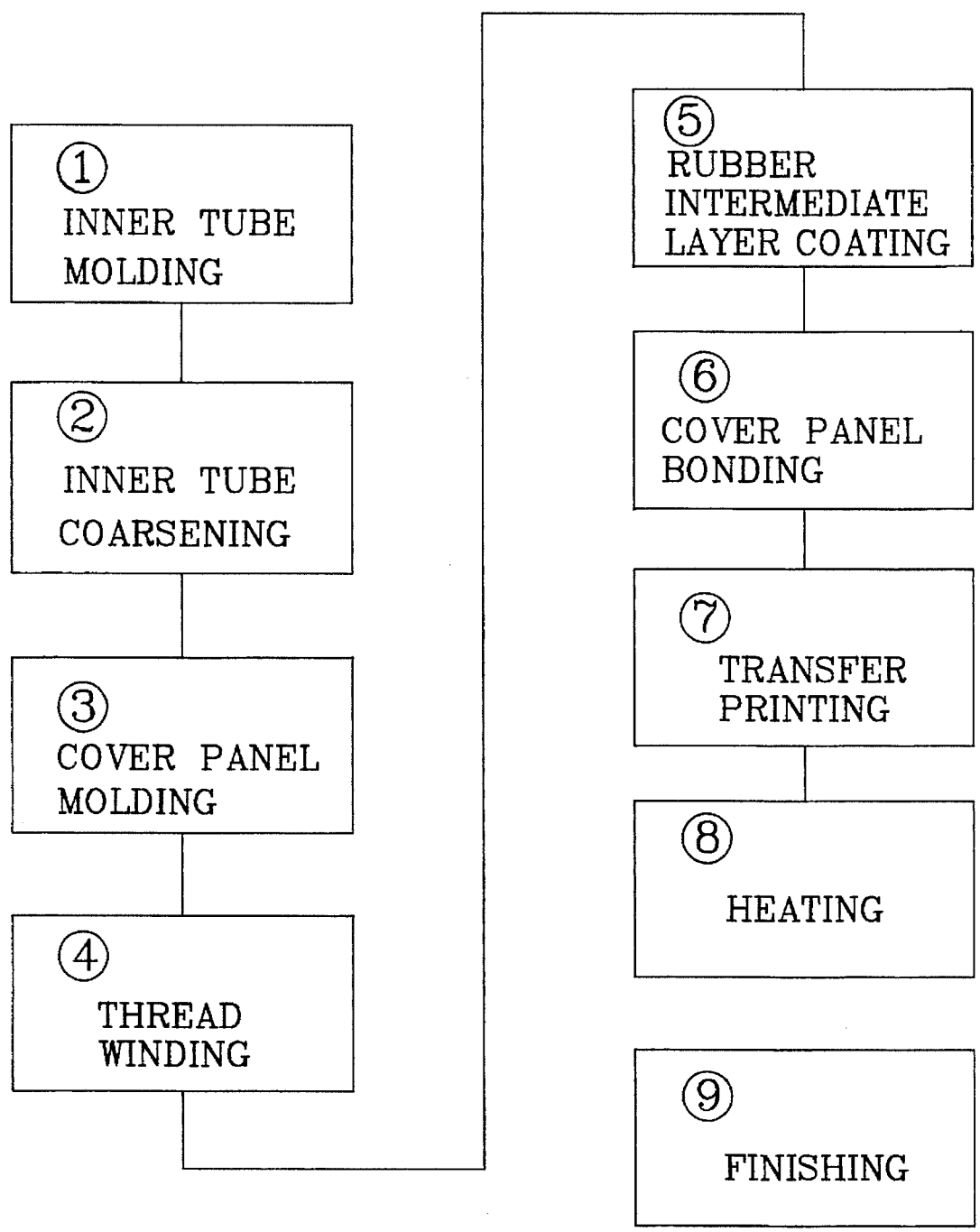
FIG. 6 is an inflatable ball production flow chart according to the prior art.

Referring to FIG. 4, the embossing machine 3 for embossing the aforesaid blank ball comprises a plurality of embossing molds 31 mounted on a conveyer above the machine base, a heating chamber 32, and a cooling chamber 33. The heating chamber 32 and the cooling chamber 33 are respectively bridged over the conveyer. The cooling chamber 33 has a plurality of spray nozzles for spraying cooling water over the embossing molds 31. Referring to FIG. 5, when blank balls obtained according to the aforesaid procedure are respectively put in the embossing molds 31, the embossing molds 31 are alternatively delivered to the heating chamber 32 and heated to 150° to 180° C. for one minute and then delivered to the cooling chamber 33 for cooling rapidly. After the cooling process, finished inflatable balls 1 are obtained.

What is claimed is:

1. A method of making an inflatable ball, the method comprising the steps of:

i) molding an inner tube from butyl rubber and then processing the outer wall of the inner tube into a coarse surface;

ii) preparing cover panels from ethylene vinyl acetate (EVA) through a foaming process and then processing the inside wall of each cover panel into a coarse surface;

iii) covering the cover panels over the inner tube to form a blank ball; and iv) embossing the surface of the blank ball thus obtained by an embossing machine through a heating process and then quickly cooling the embossed ball.

2. The method of claim 1 wherein said cover panels are covered on said inner tube in a mold by a press by giving an inflation pressure of 8 to 10 lbs to said inner tube.

3. The method of claim 1 wherein said blank ball is embossed by an embossing mold of said embossing machine by giving an inflation pressure of 6 to 9 lbs to said inner tube and heating said embossing mold to 150° to 180° C. for one minute and then quickly cooling down said embossing mold by cooling water.

* * * * *